June 28, 1960 G. R. DEMPSTER 2,942,743
AUTOMATIC HOOKS
Filed Aug. 13, 1956
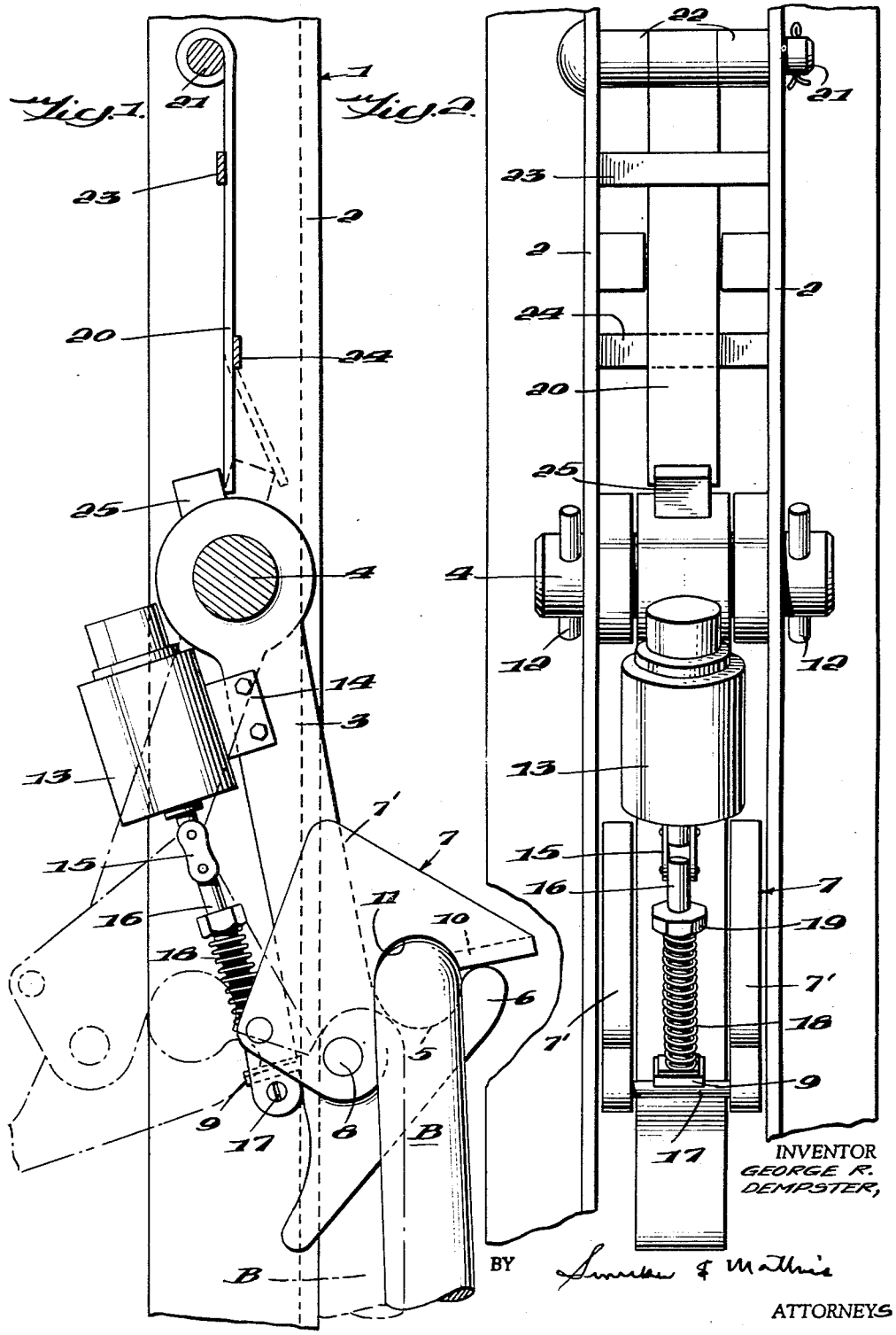
INVENTOR
GEORGE R. DEMPSTER,
BY
ATTORNEYS United States Patent Office 2,942,743
Patented June 28, 1960

2,942,743

AUTOMATIC HOOKS

George R. Dempster, % Dempster Brothers Inc., P.O. Box 3127, Knoxville 17, Tenn.

Filed Aug. 13, 1956, Ser. No. 603,737

4 Claims. (Cl. 214—317)

This invention relates to improvements in automatic hooks, particularly of the type employed in transporting and dumping equipment, such as disclosed in my prior patents, No. 2,369,722, February 20, 1945, and No. 2,404,830, July 30, 1946.

In such transporting and dumping equipment, a container is lifted by a hoisting unit onto a skid frame and is provided with a bail connected with the container for engagement with an automatic hook on the skid frame to facilitate dumping of the container either by tilting action or by lowering of a drop bottom door thereon. Frequently the containers are loaded improperly with the load centered toward one side or the other which causes a shifting of the container on the skid frame. At times the container may turn completely over because of a shifting of the load to the rear which would raise the bail out of the dumping hook. Frequently in dumping the tilt-type container, the bail is raised vertically by an upward travel of the container on the skid frame. Such occurrences may cause disengagement of the container from the skid frame and from the hook customarily provided thereon for holding the container in place, which would interfere with the proper dumping of the container and the handling thereof on the unit.

Where the hook is pivoted for freedom of swinging movement with respect to the skid frame, it is often a difficult matter to maintain the hook in position for engagement thereof by the bail, due to the easse with which the hook is moved aside by the upward movement of the bail with the container. Various attempts have been made heretofore to hold the hook in place, but none of these have proven entirely satisfactory for the purpose.

One object of the invention is to overcome the foregoing objections and to improve the construction of the automatic hook.

Another object of the invention is to provide for retaining the automatic hook yieldably in its normal position for engagement by the bail on the container, so as to insure of engagement of the hook with the bail to latch the container in a position for dumping.

Still another object of the invention is to simplify and improve the means connected with the hook for normally retaining the hook in its bail-engaging position, so as to insure of proper engagement therewith for dumping the contents from the container.

These objects may be accomplished according to one embodiment of the invention in which an automatic hook is provided with a shuttle for trapping a bail on a container seated in the hook, with means connected with the shuttle, not only for retaining the shuttle in locked relation to the bail until the shuttle is positively moved with respect thereto, but also having means for effecting release of the shuttle when desired. The shuttle is retained resiliently in its locking position, as, for example, by means of spring connection therewith, and yet suitable means may be used for releasing the shuttle when desired, either manually or by power device, such as a hydraulic cylinder, solenoid or other suitable means.

The hook includes a body portion which is pivotally mounted on the skid frame for freedom of lateral swinging movement with respect thereto. Means is provided for yieldably holding the body of the hook in its normal position for engagement of the bail therewith. This means preferably comprises a leaf spring anchored at desired points in the skid frame and yieldably engaging a lug or portion of the body of the hook in such relation thereto as normally to turn the hook to its bail-engaging position.

This provides a very simple and inexpensive means which is effective for holding the hook in proper relation to the skid frame.

This embodiment of the invention is illustrated in the accompanying drawings, in which:

Fig. 1 is a side elevation of an automatic hook mounted on a carriage, constructed according to this invention, parts being in section; and Fig. 2 is a rear elevation thereof.

The invention is shown as applied to transporting and dumping equipment of the type which uses a skid frame mounted on a carriage such as that set forth in my prior patent, No. 2,369,722, granted February 20, 1945. The carriage is designated generally by the numeral 1 and includes skid frame members or bars 2 spaced apart and adapted to receive thereon a container, either of the tilt-type or of the drop bottom type, which may be transported and dumped from the hoisting unit of the equipment. The container is usually provided with a bail B to be engaged by an automatic hook on the carriage 1 to facilitate handling and dumping of the container.

In the form shown, the automatic hook comprises a body 3 in the form of an elongated member of casting pivotally supported by a pin 4 which extends transversely of the carriage 1 between spaced portions of the skid bars 2 in which the pin 4 is secured. The lower end portion of the body 3 has a laterally projecting hook formed with a throat or seat 5 adapted to receive the bail B therein, and an extended tip 6 on the opposite side of the throat 5 from the body 3, tending to retain the bail seated in the throat.

A shuttle is indicated generally at 7 pivotally mounted at 8 on the body 3 of the hook. The shuttle 7 is formed of a pair of side plates 7' connected together along their back edges by a bar or pin 17 having a bar 9 mounted thereon, and suitably fixed thereto. The plates 7' extend forwardly in embracing relation with the body 3 on opposite sides of the latter in overlapping relation with the tip 6 of the hook, projecting outwardly from the latter. These side plates are connected together by a spacer block 10 at the forward ends thereof in position to seat upon the tip 6. The shuttle 7 is also provided with a notch 11 in the under edges of the plates 7' beside the spacer block 10 and in coacting relation with the throat 5 in the hook. The throat 5 and notches 11 are sufficiently enlarged to receive freely therein the bail B of the container, as will be apparent in Fig. 1.

The pin 4 extends through flanges on the skid frame members 2, as will be apparent from Fig. 2, and preferably this pin is retained in place by cotter pins 12.

Provision is made for opening the shuttle 7 whenever desired, to release the bar from the throat 5. In the example illustrated, this power release means comprises a solenoid 13 mounted by a bracket or brackets 14 on the body 3 of the hook. Any suitable power unit may be substituted for the solenoid 13, such as a motor, pneumatic or hydraulic cylinder, etc. The core of the solenoid 13 is connected through a link 15 with a push rod 16 which extends downward through the connecting bar 9 between the side plates 7' of the shuttle 7. The lower end of the connecting rod 16 has a slidable connection with the bar 9, but is fixed against withdrawal therefrom, A compression spring 18 is sleeved over the push rod 16 and interposed between the bar 9 and an adjusting nut or stop member 19 on the push rod for varying the compression of the spring 18 and for applying yieldable push action to the bar 9.

The bar 9 is connected with the plates 7' in such relation that upon the application of downward pressure to the bar 9 by the solenoid acting through the push rod 16 and the spring 18, the shuttle 7 will be moved counterclockwise, as viewed in Fig. 1, about the pivot 8. This will remove the shuttle from over the bail B and allow the latter to be disengaged from the throat 5 of the hook. Then, upon deenergizing of the solenoid 13, the spring 18 will tend to return the shuttle 7 to its closed position over the throat 5.

The body of the dumping hook 3 is free to swing on the pivot pin 4. Provision is made for normally tending to retain the hook in its bail-engaging position, as shown in full lines in Fig. 1. This position is maintained by a leaf spring 20 having an eyelet at one end thereof through which a pin 21 extends between the spaced skid frame bars 2. Spacers are shown at 22 (Fig. 2), on opposite sides of the leaf spring 20, to maintain the leaf spring in a centered position between the bars 2.

The leaf spring is embraced at opposite sides at longitudinally spaced points by stop members 23 and 24 that extend between the spaced skid frame bars 2, thereby tending to maintain the body of the leaf spring in a fixed relation to the bars throughout the major portion of the length of this spring. The lower end portion of the spring 20 is free to flex transversely, as indicated in dotted lines in Fig. 1. Normally, this lower end portion bears upon a lug or block 25 secured upon the upper end of the body 3 of the hook. Thus, if the dumping hook should be turned laterally to the dotted line position shown in Fig. 1, the lower end portion of the leaf spring 20 would be tensioned, normally tending to return the body portion to its full line position.

As the container is moved upward along the carriage 1, the bail B normally follows substantially against the rearward faces of the bars 2, as indicated in dotted lines in Fig. 1. The bail B will engage the inclined lower edge of the body 3 and deflect the hook laterally, toward the left in Fig. 1, sufficiently for the upper edge of the bail to engage and lift the shuttle 7, after which the hook can pass under the shuttle and drop into the throat 5.

The lower end of the hook can swing back and forth freely on the pivot pin 4 and normally is retained yieldably in its full-line position in Fig. 1 by the lower end portion of the leaf spring 20 acting on the lug or block 25 on the body 4. Thus, a very simple and effective means is provided for maintaining the hook in engaging position, not only when the carriage has the skid frame bars vertical, as shown, but also when these are slightly inclined. The same hook retaining means may be used in either event.

While the invention has been illustrated and described in one embodiment, it is recognized that variations and changes may be made therein without departing from the invention as set forth in the claims.

I claim:

1. In transporting and dumping equipment having an upright carriage with laterally spaced skid bars, the combination therewith, of an automatic hook comprising an upright elongated body between the skid bars and having a hook portion on the lower end thereof adapted to receive a bail of a container, a shuttle above the hook portion and cooperating therewith for retaining the bail in place, means for holding the shuttle yieldably in closed position over the hook portion, means mounted in the skid bars pivotally connected with the upper end portion of the elongated body and mounting the body between the skid bars for lateral swinging movement with respect thereto, and a leaf spring mounted between the skid bars and having one end portion thereof bearing upon the body normally tending to hold the body in bail-engaging position.

2. In transporting and dumping equipment having an upright carriage with laterally spaced skid bars, the combination therewith, of an automatic hook comprising an upright elongated body between the skid bars and having a hook portion on the lower end thereof adapted to receive a bail of a container, a shuttle above the hook portion and cooperating therewith for retaining the bail in place, means for holding the shuttle yieldably in closed position over the hook portion, means mounted in the skid bars pivotally connected with the upper end portion of the elongated body and mounting the body between the skid bars for lateral swinging movement with respect thereto, a leaf spring mounted between the skid bars and having one end portion thereof bearing upon the body normally tending to hold the body in bail-engaging position, and a block secured to the body at the upper end thereof in position for bearing engagement against the lower end of the leaf spring.

3. In transporting and dumping equipment having an upright carriage with laterally spaced skid bars, the combination therewith, of an automatic hook comprising an upright elongated body between the skid bars and having a hook portion on the lower end thereof adapted to receive a bail of a container, a shuttle above the hook portion and cooperating therewith for retaining the bail in place, means for holding the shuttle yieldably in closed position over the hook portion, means mounted in the skid bars pivotally connected with the upper end portion of the elongated body and mounting the body between the skid bars for lateral swinging movement with respect thereto, a leaf spring mounted between the skid bars and having one end portion thereof bearing upon the body normally tending to hold the body in bail-engaging position, a block secured to the body at the upper end thereof in position for bearing engagement against the lower end of the leaf spring, said leaf spring extending upwardly between the skid bars, means pivotally supporting the upper end of the leaf spring on the skid bars, and stops mounted on opposite sides of the leaf spring between the bars and spaced lengthwise thereof normally tending to hold the leaf spring in bearing relation against the block.

4. In transporting and dumping equipment having an upright carriage with laterally spaced skid bars, the combination therewith, of an automatic hook comprising an upright elongated body between the skid bars and having a hook portion on the lower end thereof adapted to receive a bail of a container, a shuttle above the hook portion and cooperating therewith for retaining the bail in place, means for holding the shuttle yieldably in closed position over the hook portion, means mounted in the skid bars pivotally connected with the upper end portion of the elongated body and mounting the body between the skid bars for lateral swinging movement with respect thereto, a leaf spring having one end portion thereof bearing upon the body normally tending to hold the body in bail-engaging position, and mounting means located at spaced points along the length of said leaf spring for holding said leaf spring in a predetermined position.

References Cited in the file of this patent

UNITED STATES PATENTS

| | | |
|---|---|---|
| 2,404,830 | Dempster | July 30, 1946 |
| 2,702,645 | Dempster et al. | Feb. 22, 1955 |